US007001247B2

(12) United States Patent
Shigematsu

(10) Patent No.: US 7,001,247 B2
(45) Date of Patent: Feb. 21, 2006

(54) PROCESSING APPARATUS PROVIDED WITH BACKPRESSURE SENSOR

(75) Inventor: Koichi Shigematsu, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 10/927,465

(22) Filed: Aug. 27, 2004

(65) Prior Publication Data

US 2005/0045009 A1 Mar. 3, 2005

(30) Foreign Application Priority Data

Aug. 29, 2003 (JP) ............................ 2003-306543

(51) Int. Cl.
*B24B 49/00* (2006.01)

(52) U.S. Cl. ......................... 451/11; 451/14; 125/13.01

(58) Field of Classification Search ............ 125/13.01; 451/8–12, 14
See application file for complete search history.

(56) References Cited

U.S. PATENT DOCUMENTS

| | | | | |
|---|---|---|---|---|
| 6,602,110 | B1 * | 8/2003 | Yi et al. | 451/9 |
| 6,676,491 | B1 * | 1/2004 | Arai et al. | 451/57 |
| 2001/0029938 | A1 * | 10/2001 | Arai et al. | 125/13.01 |

FOREIGN PATENT DOCUMENTS

JP 2001-298003 10/2001

* cited by examiner

*Primary Examiner*—Dung Van Nguyen
(74) *Attorney, Agent, or Firm*—Wenderoth, Lind & Ponack, L.L.P.

(57) ABSTRACT

To prevent a blowout nozzle from colliding with a workpiece due to a trouble of a backpressure sensor so as to avoid damage to the workpiece in a processing apparatus provided with a backpressure sensor, the backpressure sensor is formed capable of being freely moved at the blowout nozzle thereof in the air blowout direction and in the direction opposite thereto, and provided with a free-movement detecting sensor adapted to detect an actual free-movement of the blowout nozzle.

4 Claims, 5 Drawing Sheets

PROCESSING APPARATUS PROVIDED WITH BACKPRESSURE SENSOR

BACKGROUND OF THE INVENTION

1. Field of the Invention

The present invention relates to various kinds of processing apparatuses provided with a backpressure sensor.

2. Related Art

In order to carry out a processing operation in various kinds of processing apparatuses, it becomes necessary in some cases to detect the position and thickness of a workpiece in advance.

For example, a semiconductor chip utilized in various kinds of electronic devices is formed by dicing with use of a cutting apparatus a semiconductor wafer having a plurality of circuits formed on an outer surface thereof. It has been demanded to form a semiconductor chip thinner in order to reduce the dimensions and weight of an electronic device. In order to meet this demand, a technique called pre-dicing has been put to practical use.

The pre-dicing is a technique for forming in advance grooves in the depth corresponding to the thickness of a final semiconductor chip on an outer surface of a semiconductor wafer, thereafter exposing the groove on a rear surface of the semiconductor by grinding the rear surface of the semiconductor wafer, thereby dividing the resultant product into individual semiconductor chips. Therefore, in order to form a predetermined depth of grooves on an outer surface of a semiconductor wafer, it is necessary to know a vertical position of the outer surface of the semiconductor wafer prior to forming the grooves. When a cutting apparatus is used to form the grooves in the semiconductor wafer, it is known that a backpressure sensor is mounted on the cutting apparatus and a position of the outer surface of the semiconductor wafer is detected by using the backpressure sensor (refer to JP-A-2001-298003). The backpressure sensor disclosed therein is formed so that an air blowout nozzle is moved vertically by a driving mechanism including a pulse motor and a ball screw.

However, when a movement (downward movement) of the blowout nozzle does not stop and runs away due to trouble of the blowout nozzle, an air circulating pipe or a pressure measuring system, the blowout nozzle collides with the semiconductor wafer and damages the same. Such a problem is a problem occurring not only in a cutting apparatus but also in other processing apparatuses provided with a backpressure sensor and formed so that a blowout nozzle moves toward a workpiece.

In a processing apparatus provided with a backpressure sensor and formed so that a workpiece is detected by moving a blowout nozzle toward to the workpiece, a problem resides in the prevention of the collision of the blowout nozzle with the workpiece so as to avoid damage to the workpiece.

SUMMARY OF THE INVENTION

To solve the above problem, a processing apparatus provided with a backpressure sensor according to the present invention includes a chuck table adapted to hold a workpiece, a backpressure sensor adapted to detect a position of a surface to be processed of the workpiece held on the chuck table, and a processing unit adapted to process the object surface of the workpiece held on the chuck table. In this processing apparatus, the backpressure sensor includes a blowout nozzle adapted to blow out the air onto the workpiece, a blowout nozzle driving unit adapted to drive the blowout nozzle in the air blowout direction or in the direction opposite to the air blowout direction so as to move the blowout nozzle toward the workpiece or away from the same, an air supply source adapted to supply the air to the blowout nozzle, a first path connecting the blowout nozzle and the air supply source together, a second path connected to the air supply source and adapted to discharge the air to the atmosphere, a differential pressure sensor connected to the first and second paths and outputting the voltage corresponding to the difference between a pressure in the first path and that in the second path, and a control unit adapted to recognize a value of the voltage output by the differential pressure sensor. The characteristics of this apparatus reside in that the blowout nozzle is freely movable in the direction opposite to the air blowout direction, and a free-movement detecting sensor adapted to detect an actual free-movement of the blowout nozzle is provided with.

The free-movement detecting sensor may have a function to notify an actual free-movement of the blowout nozzle to the blowout nozzle driving unit, and the blowout nozzle driving unit has a function to drive the blowout nozzle in the direction to move away from the workpiece on receiving such a notificaton.

The processing unit may be a cutter provided with a rotary shaft, a rotary blade mounted on a free end portion of the rotary shaft, and a spindle housing supporting the rotary shaft rotatably, the blowout nozzle being fixed directly or indirectly to the spindle housing, a cutter driving unit adapted to move the rotary blade toward or away from the workpiece being provided, the cutter driving unit being formed so that the cutter driving unit serves also as the blowout nozzle driving unit.

The driving unit may include a air cylinder and a air piston accommodated freely movable vertically in the air cylinder, the blowout nozzle is fixed to the air piston so that the blowout nozzle can be freely moved, and the free-movement detecting sensor is a limit switch adapted to detect an actual contact of the blowout nozzle with the workpiece.

An alignment unit adapted to detect a specific region of a workpiece may be fixed to the spindle housing, and the backpressure sensor to the alignment unit.

According to the present invention, the blowout nozzle is capable of being moved freely in the direction opposite to the direction in which the air is blown out, and provided with a free-movement detecting sensor adapted to detect a free-movement of the blowout nozzle. Therefore, when the blowout nozzle is moved in the direction in which the blowout nozzle comes close to a workpiece and contacts the same, the blowout nozzle moves freely, and this free-movement of the blowout nozzle is detected by the free-movement detecting sensor. This enables the prevention of damage to the workpiece even when a trouble occurs in the blowout nozzle constituting the backpressure sensor, the air-circulating pipe, and a pressure measuring system, such as a diaphragm.

The free-movement detecting sensor has a function to notify an actual free-movement of the blowout nozzle to the blowout nozzle driving unit, and the blowout nozzle driving unit has a function to drive the blowout nozzle in the direction to move away from the workpiece on receiving such a notification. This enables an actual engagement of the blowout nozzle with the workpiece to be immediately avoided, so that a safer operation can be attained.

When the processing unit is a cutter, the cutter-driving unit serves also as a blowout nozzle driving unit. This enables the construction of the apparatus to be simplified, and the controlling of the rotary blade and blowout nozzle to be done easily.

DETAILED DESCRIPTION OF PREFERRED EMBODIMENT

Figure 1:
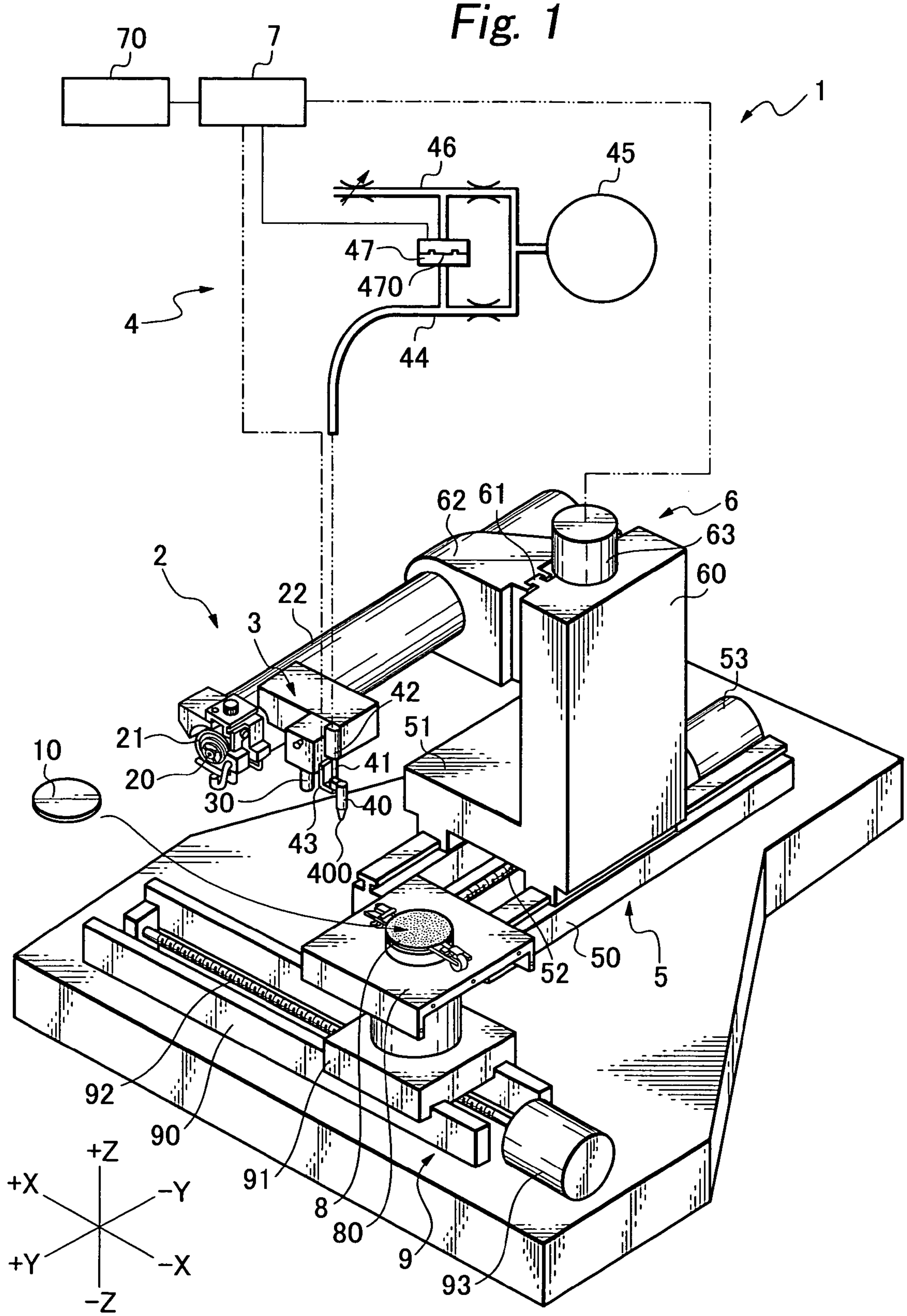
FIG. 1 is a perspective view showing a cutting apparatus provided with a backpressure sensor according to an embodiment of the present invention.

Processing apparatuses provided with a backpressure sensor include, for example, a cutting apparatus 1 shown in FIG. 1. This cutting apparatus 1 is provided with a cutter 2 including a rotary shaft 20 extending in a Y-axis direction, a rotary blade 21 mounted on a free end portion of the rotary shaft 20, and a spindle housing 22 supporting the rotary shaft 20 rotatably. The cutter 2 is a processing unit for processing an object surface of a workpiece.

An alignment unit 3 for imaging a specific region of a workpiece, for example, a region to be cut and a cut groove-carrying region by an imaging unit 30, and thereby detecting the specific region is fixed to a side portion of the spindle housing 22. A backpressure sensor 4 for detecting the position of a surface to be processed of a workpiece is fixed to the alignment unit 3, and the backpressure sensor 4 indirectly to the spindle housing 22 via the alignment unit 3. The backpressure sensor 4 may be fixed to the spindle housing 22 directly not via the alignment unit 3.

The cutter 2 is supported on a Y-axis slider 5 so that the cutter can be moved in the Y-axis direction. The Y-axis slider 5 includes a Y-axis guide rail 50 provided so as to extend in the Y-axis direction, a Y-axis moving base 51 supported slidably on the Y-axis guide rail 50, a Y-axis ball screw 52 engaged with a nut (not shown) formed on the Y-axis moving base 51, and a Y-axis pulse motor 53 adapted to rotate the Y-axis ball screw 52. The Y-axis ball screw 52 is driven by the Y-axis pulse motor 53 and rotated to cause the cutter 2 to be moved in the Y-axis direction.

A cutter driving unit 6 for driving the cutter 21 includes a Z-axis guide rail 61 provided on a side surface of a wall member 60 so that the guide rail extends in the Z-axis direction, a support member 62 slidably supported on the cutting unit 2 and the Z-axis guide rail 61, a Z-axis ball screw (not shown) engaged with a nut (not shown) formed on a support member 62 provided so as to extend in the Z-axis direction, and a Z-axis pulse motor 63 adapted to rotate the Z-axis ball screw. The Z-axis ball screw is driven by the Z-axis pulse motor 63 and rotated to cause the support member 62 to be moved vertically. The spindle housing 22 is thereby moved vertically, and the rotary blade 21 is moved toward or away from the workpiece. A control unit 7 is connected to the Z-axis pulse motor 63 constituting the cutter driving unit 6, and the Z-axis pulse motor 63 is actuated by a pulse signal supplied from the control unit 7. There is a fixed relation between the number of pulses and a quantity of vertical movement of the cutting unit 2 based on the rotation of the Z-axis pulse motor 63.

The cutting apparatus 1 is provided with a chuck table 8 for holding the workpiece. The chuck table 8 is supported rotatably on an X-axis moving table 80, which is supported on an X-axis slider 9 so that the X-axis moving table 80 can be moved in the X-axis direction.

The X-axis slider 9 includes an X-axis guide rail 90 provided so as to extend in the X-axis direction, an X-axis moving base 91 supported slidably on the X-axis guide rail 90, an X-axis ball screw 92 engaged with a nut (not shown) formed on the X-axis moving base 91 and an X-axis pulse motor 93 adapted to rotate the X-axis ball screw 92. The X-axis moving table 80 supporting the chuck table 8 rotatably is fixed to the X-axis moving base 91. The X-axis ball screw 92 is rotated by being driven by the X-axis pulse motor 93, and the chuck table 8 is thereby moved in the X-axis direction.

When the workpiece 10 held on the chuck table 8 is cut, the X-axis ball screw 92 is rotated by being driven by the X-axis pulse motor 93 to cause the chuck table 8 to be moved in the +X direction, while the Y-axis ball screw 52 is rotated by being driven by the Y-axis pulse motor 53 to cause the cutter 2 to be moved in the Y-axis direction. As a result, the rotary blade 21 is set in a suitable position. Furthermore, when the Z-axis ball screw is rotated by being driven by the Z-axis pulse motor 63, the spindle housing 22 is moved down. The high-speed rotating rotary blade 21 thereby cuts in a predetermined portion of the workpiece 10. The portion of the workpiece 10 to be cut in with the rotary blade 21 is detected by the alignment unit 3.

Since the Z-axis pulse motor 63 constituting the cutter driving unit 6 is controlled by a pulse signal supplied from the control unit 7, the cutting quantity of the rotary blade 21 with respect to the workpiece 10 is controlled by the control unit 7. The control unit 7 can recognize the position of the rotary blade 21 in the Z-axis direction by the number of pulses supplied to the Z-axis pulse motor 63.

The backpressure sensor 4 fixed to the spindle housing 22 via the alignment unit 3 is provided with the blowout nozzle 40 adapted to blow out the air onto the workpiece 10. The blowout nozzle 40 is driven by the cutter driving unit 6, and movable in the air blowout direction or in the direction opposite thereto, the cutter driving unit 6 in this mode of embodiment serving also as the blowout nozzle driving unit. In the backpressure sensor 4, the blowout nozzle 40 is loosely fit onto the free end portion of an air piston 41 so that can freely move in the vertical direction, and the air piston 41 is fit into an air cylinder 42 movably in the vertical direction (Z-axis direction). On the lower side of the air piston 41, the free-movement detecting sensor 43 adapted to limit an actual downward movement and detect an actual upward free-movement of the blowout nozzle 40 is provided.

In the backpressure sensor 4, the blowout nozzle 40 is connected to the air supply source 45 via the first path 44. The second path 46 is also connected to the air supply source 45, and communicates with the atmosphere. A gas is supplied from the air supply source 45 to the first path 44 and second path 46 at the same rate.

Between the first path 44 and second path 46, the differential pressure sensor 47 is connected. The differential pressure sensor 47 is provided with a diaphragm 470, which is adapted to be displaced in accordance with a difference between the pressure in the first path 44 and that in the second path 46. The differential pressure sensor 47 outputs a voltage corresponding to the quantity of displacement of the diaphragm 470 to the control unit 7.

The blowout nozzle 40 faces at a blowout port 400 thereof provided at a free end portion of the same nozzle in the direction in which the blow nozzle is opposed to the workpiece 10. When the air piston 41 moves down, the workpiece 10 and blowout port 400 can be brought dose to each other.

An actual free-movement of the blowout nozzle 40 in the direction opposite to the air blowout direction is detected by the free-movement detecting sensor 43. The free-movement detecting sensor 43 is made of, for example, a limit switch, and capable of recognizing that the blowout portion 400 of the blowout nozzle 40 contacted an object surface 100 of the workpiece 10, avoiding a further downward movement of the blowout nozzle 40, and prevent the blowout nozzle 40 and workpiece 10 from contacting each other.

The free-movement detecting sensor 43 is connected to the Z-axis pulse motor 63 of the cutter driving unit 6. When the free-movement detecting sensor 43 detects an actual contact of the blowout nozzle and the workpiece 10 with each other, the fact is notified to the blowout nozzle driving unit 6. Although in the example of FIG. 1, the cutter driving unit 6 is formed so as to serve also as a blowout nozzle driving unit, the cutter driving unit and blowout nozzle driving unit may also be formed separately.

When an obstacle does not exist in the air blowout direction of the blowout port 400 of the blowout nozzle 40, the first path 44 is also necessarily opened to the atmosphere just as the second path 46. Therefore, the pressure in the first path 44 and that in the second path 46 become equal to each other, and the diaphragm 470 of the differential pressure sensor 47 reaches a state of equilibrium, a voltage value output from the differential pressure sensor 47 becoming, for example, 1 V. When the blowout port 400 of the blowout nozzle 49 comes dose to the workpiece 10, the air blown out from the blowout port 400 is reflected upon the workpiece 10, so that the pressure in the first path 44 changes. As a result, the diaphragm 470 ceases to be in a state of equilibrium, and the voltage corresponding to the distance between the blowout port 400 and workpiece 10 is output from the differential pressure sensor 47.

Figure 2:
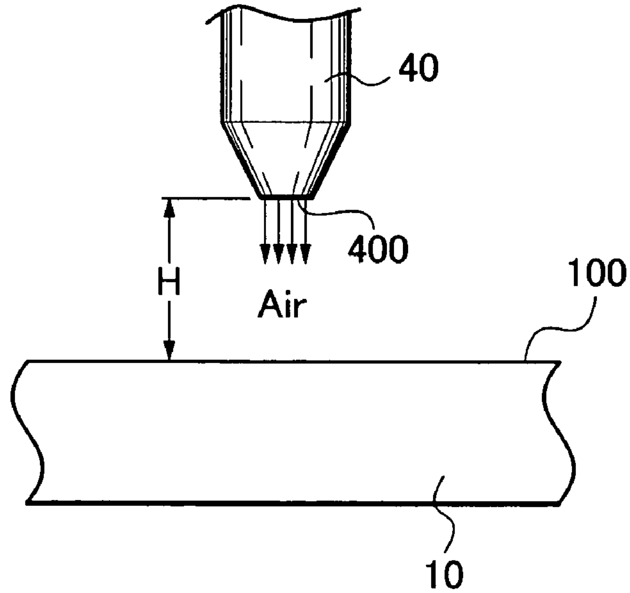
FIG. 2 is a front view showing a blowout nozzle and a workpiece of the apparatus.

The control unit 7 is connected to the differential pressure sensor 47, and adapted to read the value of voltage output from the differential sensor 47, and controls the cutter driving unit 6 (Z-axis pulse motor 63) in accordance with the mentioned value. A memory unit 70 is connected to the control unit 7. The memory unit 70 stores therein in advance the relation between a distance H between the blowout port 400 of the blowout nozzle 40 shown in FIG. 2 and the surface 100 to be processed of the workpiece 10 and the value of the voltage output from the differential pressure sensor 47 as corresponding information. The control unit 7 is capable of determining the distance between the blowout port 400 and the surface 100 to be processed, on the basis of the voltage value output from the differential pressure sensor 47 and the corresponding information stored in the memory unit 70.

Figure 3:
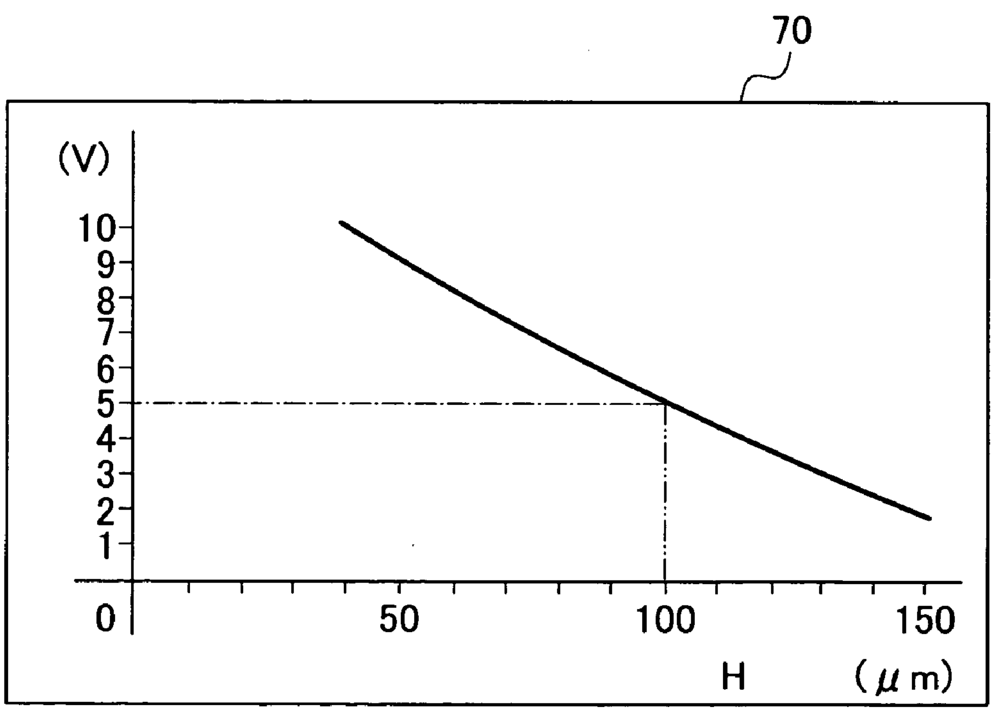
FIG. 3 is a graph showing an example of corresponding information to be stored in a memory unit of the apparatus.

In order to determine this corresponding information, the blowout nozzle 40 is moved down first so as to bring the blowout port 400 into contact with the surface 100 to be processed, and this position is made to be recognized as an origin by the control unit 7. The blowout nozzle 40 is then moved up and stopped in a position of a predetermined height. The voltage value is measured as the distance between the blowout port 400 and the surface 100 to be processed is reduced by gradually moving down the blowout nozzle 40 from this position of a predetermined height. The distance between the origin and blowout port 400 can be determined on the basis of the number of pulses supplied from the control unit 7 to the Z-axis pulse motor 63, so that the results shown in FIG. 3 in which the distance H between the origin and blowout port 400 and voltage value are shown correspondingly can be obtained. The results are stored as corresponding information in the memory unit 70.

Figure 4:
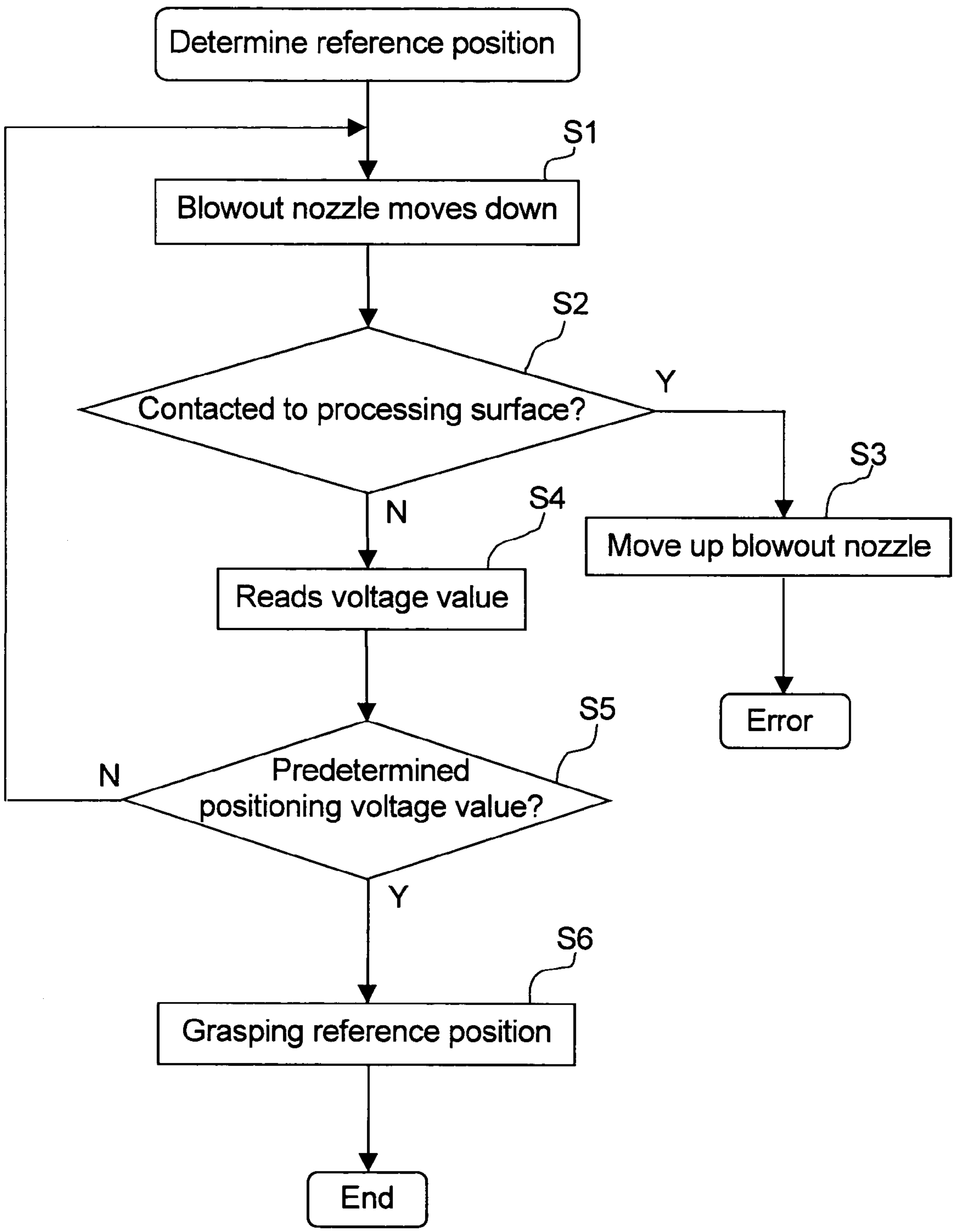
FIG. 4 is a flow chart showing an example of a method of using the backpressure sensor of the apparatus.
Figure 5A:
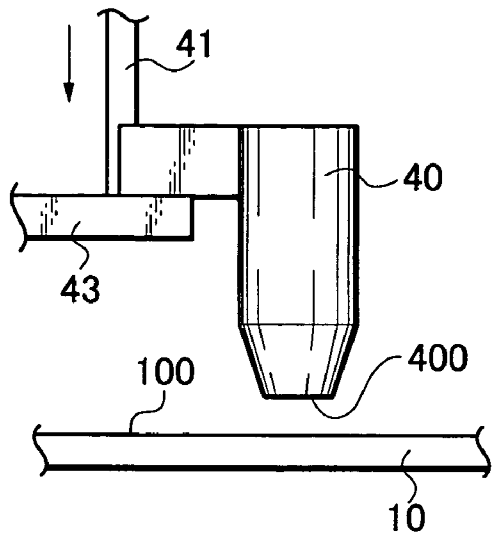
FIG. 5(A) is a schematic view showing the condition of the blowout nozzle moved down toward the workpiece.

When the corresponding information is stored in the memory unit 70, a reference position for carrying out a cutting operation is then determined. The procedure for determining the reference position will now be described below in accordance with the flow chart of FIG. 4 and with reference to FIG. 5 as well. First, the blowout nozzle 40 is moved down (Step S1) as shown in FIG. 5(A), by driving the Z-axis pulse motor 63 of the cutter driving unit 6 by the control unit 7. During this time, the blowout nozzle 40 is in contact with the free-movement detecting sensor 43.

Figure 5B:
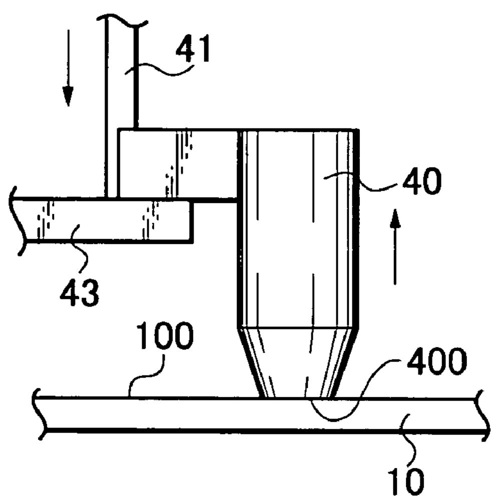
FIG. 5(B) is a schematic view showing the condition of the blowout nozzle moving freely as the blowout nozzle contacts at a blowout port thereof a surface to be processed.
Figure 5C:
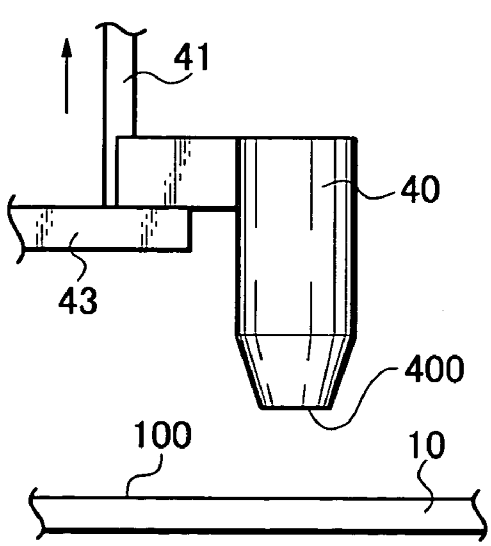
FIG. 5(C) is a schematic view showing the condition of the blowout nozzle being moved up.

As shown in FIG. 5(B), when, for example, the diaphragm 470 is out of order, a correct voltage cannot be detected, so that it is impossible to detect a position 100 μm distant from, for example, the surface 100 to be processed and stop the X-axis pulse motor 63. When in such a case the blowout port 400 of the blowout nozzle 40 contacted the object surface 100 of the workpiece 10, since the blowout nozzle 40 is loosely fit onto the air piston 41, the blowout nozzle 40 leaves the free-movement detecting sensor 43 and is moved freely in the upward direction, and the contact of the blowout port and the surface 100 to be processed with each other is detected and notified to the control unit 7. As shown in FIG. 5(C), the Control unit 7 controls the Z-axis pulse motor 63 of the cutter driving unit 6 to move up the blowout nozzle 40 with the air piston 41 (Steps S2, S3).

When the blowout nozzle 40 is moved down as mentioned with the blowout nozzle 40 and differential pressure sensor 47 found to be out of order, the value of the voltage output from the differential pressure sensor 47 is not normal. Therefore, in a related art apparatus of this kind, the blowout nozzle 40 is moved down more than necessary, so that there is the possibility that the blowout nozzle 40 collides with the workpiece 10 to damage the same. However, the actual contact of the blowout port 400 and workpiece 10 with each other is detected in the present invention by the free-movement detecting sensor 43, and, moreover, the blowout nozzle 40 can be moved freely in the upward direction. Therefore, when the blowout port contacts the workpiece 10, the blowout port is automatically raised as shown in FIG. 5, and the blowout nozzle 40 does not lower any more. Accordingly, since the imparting of a large force from the blowout nozzle 40 to the workpiece 10 does not occur, the workpiece 10 is not damaged.

When the backpressure sensor 4 is normal, the control unit 7 reads the value of the voltage output successively from the differential pressure sensor 47 while moving down the blowout nozzle 40 (Step S4), to judge whether or not the distance between the blowout port 400 and the surface 100 to be processed attains a desired level on the basis of a judgment as to whether or not the voltage value agrees with a predetermined positioning voltage value (Step S5). This judgment on the distance is made on the basis of the corresponding information stored in the memory unit 70. For example, when a desired distance between the blowout port 400 and the surface 100 to be processed is 100 μm, a voltage value of 5V in the graph of FIG. 3 corresponding to 100 μm becomes the positioning voltage, and a judgment is made as to whether the voltage output from the differential pressure sensor 47 is 5V or not.

The time when the control unit 7 reads 5V is the time at which the distance between the blowout port 400 and the surface 100 to be processed becomes 100 μm. The position in the Z-axis direction of the blowout port 400 at this time is stored as a reference position in the control unit 7, and the cutter driving unit 6 is stopped. The position in the Z-axis direction of the blowout port 400 is grasped on the basis of the number of pulses with respect to the Z-axis pulse motor 63 (Step S6).

Figure 6:
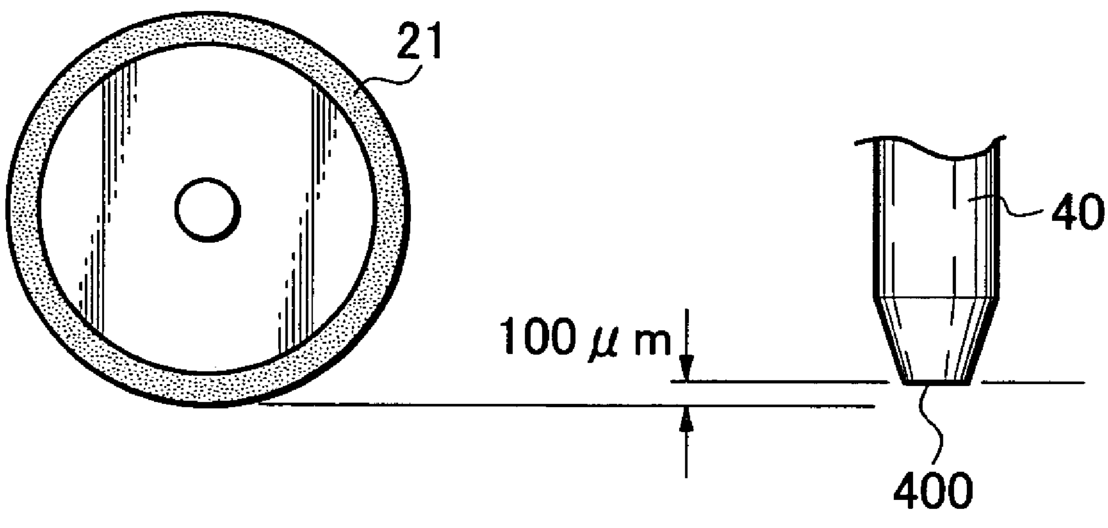
FIG. 6 is a schematic view showing an example of the positional relation between the blowout nozzle and rotary blade.

When the reference position is thus determined, the rotary blade 21 is lowered with this reference position used as a basis, and a cutting quantity thereof during a cutting operation can be controlled. For example, when a lower end of the rotary blade 22 is lower than the position in the Z-axis direction of the blowout port 400 by 100 μm as shown in FIG. 6 with the blowout port 400 existing in the reference position determined in the above-mentioned Step S6, the lower end of the rotary blade 21 is positioned on the object surface 100 of the workpiece 10. Therefore, the depth of a cut made by the rotary blade 21 can be controlled on the basis of a downward driving quantity measured from this reference position. In order to cut the workpiece 10 with the rotary blade 21, the air piston 41 is moved up so that the blowout nozzle 40 does not stand in the way Since the present invention is capable of detecting the contact of the blowout nozzle and a workpiece with each other by the free-movement detecting sensor, the invention can be utilized for the purpose of processing a workpiece safely preventing from damage of the workpiece.

What is claimed is:

1. A processing apparatus having a chuck table adapted to hold a workpiece, a backpressure sensor adapted to detect a position of a surface to be processed of the workpiece held on the chuck table, and a processing unit adapted to process the surface of the workpiece held on the chuck table, wherein:

the backpressure sensor includes a blowout nozzle adapted to blow air onto the workpiece, the blowout nozzle being freely movable in the air blowout direction and in the direction opposite thereto, a driving unit adapted to drive the blowout nozzle in the air blowout direction or in the direction opposite to the air blowout direction so as to move the blowout nozzle toward or away from the workpiece, an air supply source adapted to supply the air to the blowout nozzle, a first path connecting the blowout nozzle and air supply source together, a second path connected to the air supply source and arranged to discharge the air to the atmosphere, a differential pressure sensor connected to the first and second paths and adapted to output a voltage corresponding to a difference between the pressure in the first path and the pressure in the second path, a control unit adapted to recognize a value of a voltage output from the differential pressure sensor, and a free-movement detecting sensor adapted to detect an actual free-movement of the blowout nozzle, wherein the free-movement detecting sensor has a function to notify an actual free-movement of the blowout nozzle to the blowout nozzle driving unit, and the blowout nozzle driving unit has a function to drive the blowout nozzle in the direction to move away from the workpiece on receiving such a notification.

2. A processing apparatus provided with a backpressure sensor according to claim 1, wherein the processing unit is a cutter provided with a rotary shaft, a rotary blade mounted on a free end portion of the rotary shaft, and a spindle housing supporting the rotary shaft rotatably, the blowout nozzle being fixed directly or indirectly to the spindle housing, a cutter driving unit adapted to move the rotary blade toward or away from the workpiece being provided, the cutter driving unit being formed so that the cutter driving unit serves also as the blowout nozzle driving unit.

3. A processing apparatus provided with a backpressure sensor according to claim 2, wherein an alignment unit for detecting a specific region of the workpiece is fixed to the spindle housing, and the backpressure sensor is fixed to the alignment unit.

4. A processing apparatus provided with a backpressure sensor according to claim 1, wherein the driving unit includes an air cylinder and an air piston accommodated freely movable vertically in the air cylinder, the blowout nozzle is fixed to the air piston so that the blowout nozzle can be freely moved, and the free-movement detecting sensor is a limit switch adapted to detect an actual contact of the blowout nozzle with the workpiece.

* * * * *